United States Patent
Agrawal et al.

(10) Patent No.: US 12,189,940 B2
(45) Date of Patent: Jan. 7, 2025

(54) FINGERPRINT ENCODED GESTURE INITIATION OF DEVICE ACTIONS

(71) Applicant: Motorola Mobility LLC, Chicago, IL (US)

(72) Inventors: Amit Kumar Agrawal, Bangalore (IN); Manoj Jain, Bangalore (IN); Varun Shrivastava, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/190,667

(22) Filed: Mar. 27, 2023

(65) Prior Publication Data
US 2024/0329827 A1    Oct. 3, 2024

(51) Int. Cl.
| | |
|---|---|
| G06F 3/048 | (2013.01) |
| G06F 3/04883 | (2022.01) |
| G06F 21/32 | (2013.01) |
| G06V 40/12 | (2022.01) |
| G06V 40/16 | (2022.01) |

(52) U.S. Cl.
CPC .......... *G06F 3/04883* (2013.01); *G06F 21/32* (2013.01); *G06V 40/12* (2022.01); *G06V 40/172* (2022.01)

(58) Field of Classification Search
CPC ...... G06F 3/04883; G06F 21/32; G06V 40/12
See application file for complete search history.

(56) References Cited

U.S. PATENT DOCUMENTS

| | | | | |
|---|---|---|---|---|
| 8,027,518 B2 * | 9/2011 | Baker | ............ | G06V 40/12 |
| | | | | 345/169 |
| 9,098,735 B2 * | 8/2015 | Cho | ............ | G06F 3/0227 |
| 9,245,166 B2 * | 1/2016 | Huang | ............ | G06F 3/0488 |
| 9,465,930 B2 * | 10/2016 | Alten | ............ | G06F 21/32 |
| 9,489,127 B2 * | 11/2016 | Kim | ............ | G06V 40/13 |

(Continued)

OTHER PUBLICATIONS

"Xiaomi patents technology for full screen under-display fingerprint scanner", India Today [retrieved Mar. 13, 2023]. Retrieved from the Internet <https://www.indiatoday.in/technology/news/story/xiaomi-patents-technology-for-full-screen-under-display-fingerprint-scanner-1897971-2022-01-09>., Jan. 9, 2022, 5 Pages.

(Continued)

*Primary Examiner* — Steven B Theriault
(74) *Attorney, Agent, or Firm* — FIG. 1 Patents

(57) ABSTRACT

Techniques for fingerprint encoded gesture initiation of device actions are described and are implementable to perform a variety of functionality based on touch-based gestures that are fingerprint encoded. For instance, a mobile device receives an input including a touch-based gesture. The mobile device generates fingerprint identity information based on the touch-based gesture, such as by a fingerprint sensor area that is operable to detect a pattern of a fingerprint in contact with the fingerprint sensor area. Based on the fingerprint identity information, the mobile device determines that the fingerprint identity information is associated with a user of the mobile device. The mobile device then performs an action that corresponds to the touch-based gesture, e.g., based on a shape of the gesture. In one example, the action includes display of a customized user interface associated with a user profile that corresponds to the touch-based gesture.

20 Claims, 10 Drawing Sheets

(56) References Cited

U.S. PATENT DOCUMENTS

| | | | |
|---|---|---|---|
| 9,582,296 B2* | 2/2017 | Arcese | H04L 63/0861 |
| 9,652,061 B2* | 5/2017 | North | G06F 3/041 |
| 9,697,345 B2* | 7/2017 | Mo | G06F 21/32 |
| 9,852,277 B2* | 12/2017 | Park | G06F 21/34 |
| 9,900,422 B2* | 2/2018 | Lee | H04W 12/08 |
| 9,946,861 B2* | 4/2018 | Yoon | G06F 21/32 |
| 10,055,634 B2* | 8/2018 | Han | H04L 9/3231 |
| 10,169,633 B2* | 1/2019 | Mo | G06V 40/1306 |
| 10,521,579 B2* | 12/2019 | Van Os | H04L 9/3231 |
| 10,579,411 B2* | 3/2020 | Aluvala | H04L 63/0853 |
| 10,747,983 B2* | 8/2020 | Choi | G06F 3/04886 |
| 10,990,260 B2 | 4/2021 | Gorsica et al. | |
| 11,099,719 B1* | 8/2021 | Thompson | G06F 3/0482 |
| 11,144,772 B2* | 10/2021 | Li | G06V 10/993 |
| 11,175,833 B2* | 11/2021 | Gaillet | G06F 13/1668 |
| 11,209,961 B2* | 12/2021 | Pope | G06F 1/169 |
| 11,263,432 B2* | 3/2022 | Othman | G06V 40/1371 |
| 11,442,753 B1* | 9/2022 | Ramanathan | G06F 16/955 |
| 11,803,250 B2* | 10/2023 | Siu | G06V 40/50 |
| 2002/0163506 A1* | 11/2002 | Matusis | G06F 3/0219 345/173 |
| 2003/0048260 A1* | 3/2003 | Matusis | G06F 3/0481 345/173 |
| 2005/0169503 A1* | 8/2005 | Howell | G06F 3/011 340/5.83 |
| 2008/0147510 A1* | 6/2008 | Wimberly | H04N 21/4516 705/18 |
| 2008/0166028 A1* | 7/2008 | Turek | G06V 40/1306 382/124 |
| 2008/0240523 A1* | 10/2008 | Benkley | G06V 40/1335 382/126 |
| 2008/0317292 A1* | 12/2008 | Baker | G06V 40/12 382/115 |
| 2009/0010503 A1* | 1/2009 | Mathiassen | G06F 21/35 382/125 |
| 2009/0028395 A1* | 1/2009 | Riionheimo | G06F 21/32 382/124 |
| 2009/0094555 A1* | 4/2009 | Viitala | H04M 1/72427 715/838 |
| 2009/0102604 A1* | 4/2009 | Madhvanath | G06F 3/03547 340/5.83 |
| 2009/0169070 A1* | 7/2009 | Fadell | G06F 21/32 382/124 |
| 2009/0224874 A1* | 9/2009 | Dewar | G06F 21/36 340/5.53 |
| 2009/0282258 A1* | 11/2009 | Burke | G06F 21/6281 713/184 |
| 2010/0225607 A1* | 9/2010 | Kim | G06F 3/042 345/173 |
| 2010/0231356 A1* | 9/2010 | Kim | G06F 3/048 715/810 |
| 2010/0240415 A1* | 9/2010 | Kim | G06F 21/32 455/565 |
| 2010/0265204 A1* | 10/2010 | Tsuda | H04M 1/72403 715/764 |
| 2010/0302165 A1* | 12/2010 | Li | G06F 3/023 345/168 |
| 2011/0102567 A1* | 5/2011 | Erhart | G06V 40/1335 445/24 |
| 2011/0287741 A1* | 11/2011 | Prabhu | G06F 21/629 455/411 |
| 2012/0044156 A1* | 2/2012 | Michaelis | G06F 3/03547 345/173 |
| 2012/0299814 A1* | 11/2012 | Kwon | G06F 9/451 345/156 |
| 2013/0097695 A1* | 4/2013 | Sipe | G06F 9/4451 726/17 |
| 2013/0129162 A1* | 5/2013 | Cheng | G06V 40/20 382/124 |
| 2013/0169577 A1* | 7/2013 | Rofougaran | G06F 21/36 345/173 |
| 2013/0324089 A1* | 12/2013 | Kim | G06F 21/6218 455/411 |
| 2014/0056493 A1* | 2/2014 | Gozzini | G06V 40/1394 382/124 |
| 2014/0122859 A1* | 5/2014 | Ruelas | G06F 21/572 713/2 |
| 2014/0189850 A1* | 7/2014 | Marshall | G06F 21/316 726/17 |
| 2014/0210728 A1* | 7/2014 | Busse | G06F 9/44505 345/173 |
| 2014/0282931 A1* | 9/2014 | Protopapas | B60R 25/2081 726/5 |
| 2015/0135108 A1* | 5/2015 | Pope | A63F 13/42 715/767 |
| 2015/0199553 A1* | 7/2015 | Kim | G06F 3/041661 348/77 |
| 2015/0199555 A1* | 7/2015 | Kim | G06F 3/04883 382/124 |
| 2015/0205622 A1* | 7/2015 | DiVincent | G06F 9/4451 713/100 |
| 2015/0220767 A1* | 8/2015 | Yoon | G06V 40/12 382/124 |
| 2015/0324564 A1* | 11/2015 | Sahu | H04W 12/065 726/19 |
| 2015/0324570 A1* | 11/2015 | Lee | G06V 10/242 382/124 |
| 2015/0363632 A1* | 12/2015 | Ahn | H04W 12/069 382/124 |
| 2015/0371073 A1* | 12/2015 | Cho | G06F 21/32 382/124 |
| 2016/0042166 A1* | 2/2016 | Kang | G06F 3/04886 726/7 |
| 2016/0063230 A1* | 3/2016 | Alten | G06F 21/32 726/28 |
| 2016/0072819 A1* | 3/2016 | Chen | G06F 21/32 726/4 |
| 2016/0085564 A1* | 3/2016 | Arcese | H04L 63/0861 726/7 |
| 2016/0124625 A1* | 5/2016 | Lawton | H04N 21/4316 715/800 |
| 2016/0217310 A1* | 7/2016 | Shah | G06V 40/67 |
| 2016/0239649 A1* | 8/2016 | Zhao | H04W 12/065 |
| 2017/0160922 A1* | 6/2017 | Chiarini | G06F 3/0488 |
| 2017/0213019 A1* | 7/2017 | Mao | G06F 3/0488 |
| 2017/0308294 A1* | 10/2017 | Creager | G06F 1/1692 |
| 2018/0200623 A1* | 7/2018 | Palikuqi | A63F 13/73 |
| 2018/0224999 A1* | 8/2018 | Lee | H04W 12/06 |
| 2018/0357386 A1* | 12/2018 | Sanjay-Gopal | H04L 67/535 |
| 2019/0187870 A1* | 6/2019 | Bostick | G06F 3/04886 |
| 2019/0332843 A1* | 10/2019 | Li | G09G 3/3208 |
| 2019/0362129 A1* | 11/2019 | Sandhan | H04M 1/725 |
| 2019/0386988 A1* | 12/2019 | Segura Perales | A61B 5/117 |
| 2020/0311234 A1* | 10/2020 | Nicholson | G06V 40/13 |
| 2020/0412703 A1* | 12/2020 | Kohli | G06F 21/6245 |
| 2022/0318353 A1* | 10/2022 | Zourob | G06F 1/1684 |
| 2024/0020367 A1* | 1/2024 | Shen | H04M 1/724631 |

OTHER PUBLICATIONS

The Leakster, "Samsung Galaxy Note 20—World's First Full Screen Fingerprint Scanner", YouTube, uploaded by The Leakster [retrieved Mar. 13, 2023]. Retrieved from the Internet <https://www.youtube.com/watch?v=SwR6IK6JuK0>., May 15, 2020, 3 Pages.

* cited by examiner

FINGERPRINT ENCODED GESTURE INITIATION OF DEVICE ACTIONS

BACKGROUND

Today's modern devices are implemented in a variety of different form factors and provide an array of different functionality. For instance, a typical smart device (e.g., a smartphone) provides compact sources of functionality such as wireless communication, image capture, games, social media, web browsing, and so forth. To enable functionality of a mobile device to be accessed, typical mobile devices include different controls such as hardware buttons, touch screens, and so forth, that can receive user interaction to activate the devices and access available functions. Some modern devices include a fingerprint sensor for user authentication, such as to unlock the smart device. However, functionality controllable by the fingerprint sensor is limited and inadvertent user contact with the fingerprint sensor can cause unwanted device unlocking which can reduce user satisfaction.

BRIEF DESCRIPTION OF THE DRAWINGS

Aspects of fingerprint encoded gesture initiation of device actions are described with reference to the following Figures. The same numbers may be used throughout to reference similar features and components that are shown in the Figures.

DETAILED DESCRIPTION

Figure 1:
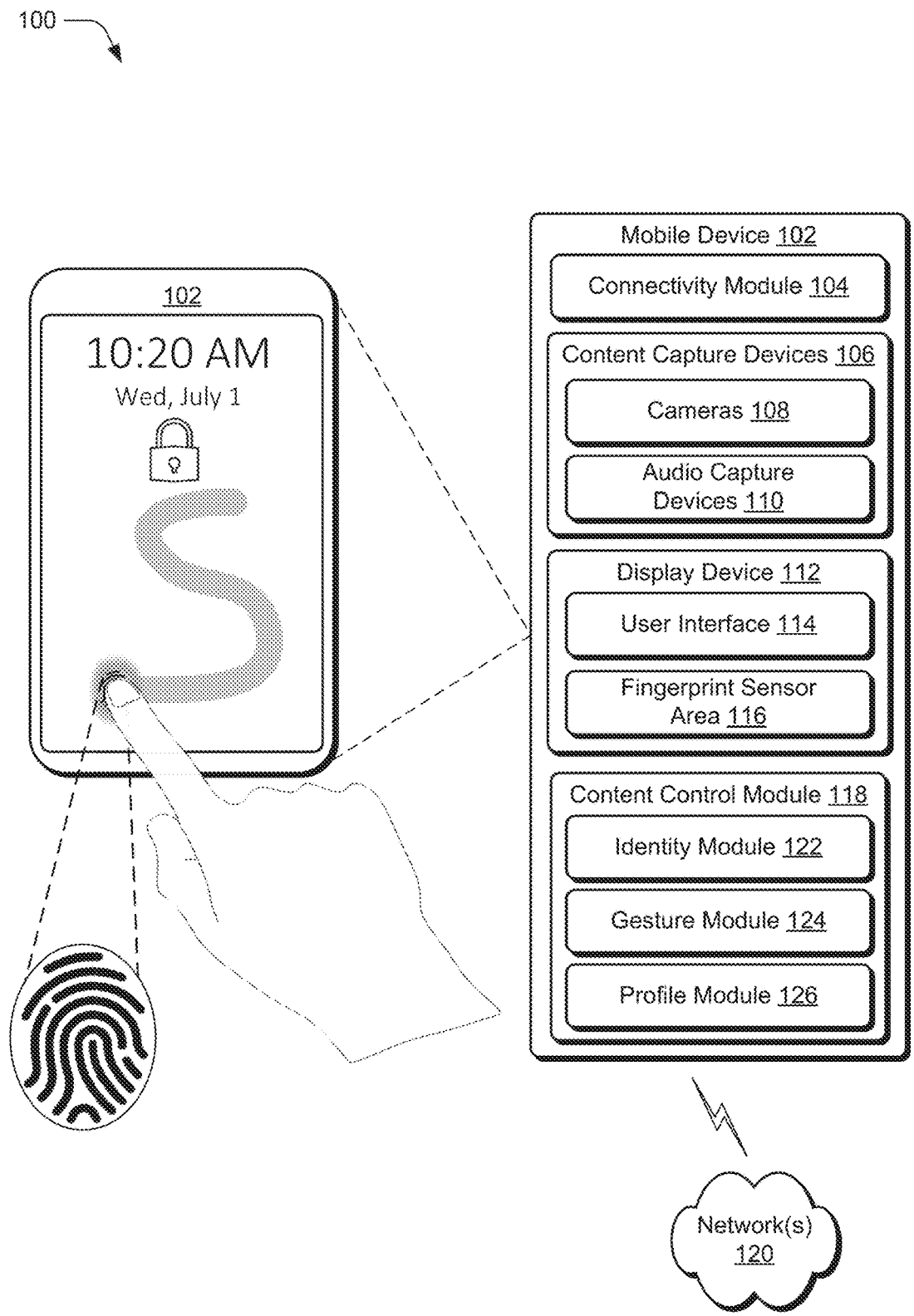
FIG. 1 illustrates an example environment in which aspects of fingerprint encoded gesture initiation of device actions can be implemented.

Techniques for fingerprint encoded gesture initiation of device actions are described and are implementable to perform a variety of functionality based on touch-based gestures that are fingerprint encoded. The described implementations, for instance, enable secure and efficient initiation of display of a first customized user interface (e.g., an "admin" user interface) by a mobile device based on receipt of a first touch-based gesture, while receipt of a second touch-based gesture causes display of a second customized user interface, e.g., a restricted user interface.

According to various implementations, a computing device e.g., a mobile device such as a smartphone, includes a display screen with an integrated fingerprint sensor area. The fingerprint sensor area, for instance, is operable to detect a pattern of a fingerprint in contact with the fingerprint sensor area such as to perform fingerprint authentication. Fingerprint authentication is used to determine whether a fingerprint detected in contact with the fingerprint sensor area matches a particular user identity, e.g., a user of the mobile device. Generally, the fingerprint sensor area is a size that enables receipt of a touch-based gesture such as one or more strokes as further described below. In some examples, the fingerprint sensor area is the size of the display screen. Alternatively or additionally, the fingerprint sensor area is one or more portions of the display screen.

Consider an example in which a user of the mobile device is a parent of a young child, and desires to place the mobile device in a "child mode" that enables certain features of the mobile device while restricting access to other features and/or functionality of the mobile device. For instance, the child mode permits access to a content viewing app of the mobile device, e.g., to display the young child's favorite show, while restricting access to other features such as call, text messaging, social media, internet functionality, etc. Conventional techniques to enable restricted access sessions are limited and require a user to navigate through multiple screens to initiate and/or configure a restricted access session, which is time-consuming, computationally inefficient, and frustrating for the user.

Accordingly, the techniques described herein support initiation of a variety of tasks based on various fingerprint encoded gestures. The mobile device, for instance, is configured to receive an input including a touch-based gesture. Generally, the touch-based gesture includes one or more "touches" and/or strokes to the fingerprint sensor area. For example, the touch-based gesture is defined by a shape of a user stroke to the fingerprint sensor area such as a pattern, letter, number, etc. In some examples, the touch-based gesture includes multiple strokes made by two or more digits of the user. Further, the touch-based gestures can be configured to correspond to a variety of actions as further described below. Continuing the above example, the mobile device receives a particular touch-based gesture that includes a user stroke by the parent to draw a "C" shape on the fingerprint sensor area, such as on a lock screen displayed by the mobile device.

Based on the touch-based gesture, the mobile device generates fingerprint identity information. The fingerprint identity information, for instance, identifies attributes such as physical characteristics of one or more of a user's digits. In some embodiments, the mobile device samples different spatial locations of the touch-based gesture to extract a number of instances of user fingerprints. The mobile device can compare the instances of user fingerprints to one another as part of generating the fingerprint identity information. In this way, the techniques described herein provide a level of security not possible using conventional techniques, which are limited to detection of a single instance of a user's fingerprint.

The mobile device is then operable to authenticate the fingerprint identity information, such as to determine whether the fingerprint identity information is associated with a user of the mobile device. In one example, the mobile device compares the fingerprint identity information extracted from the touch-based gesture against stored fingerprint identity information to determine "who" the fingerprint belongs to. For instance, the mobile device leverages the fingerprint identity information to determine whether a fingerprint detected in contact with the fingerprint sensor area matches a particular user identity, e.g., a user of the mobile device. In various implementations, the mobile device is operable to further validate the fingerprint identity information against a facial profile of the user using facial recognition techniques. Continuing the above example, the mobile device generates fingerprint identity information based on the "C-shaped" touch-based gesture that identifies physical characteristics of the parent's fingerprint. The mobile device verifies that the fingerprints are associated with the parent, and that the parent is permitted to invoke functionality of the mobile device.

Responsive to verification of the fingerprint identity information, the mobile device is operable to perform an action that corresponds to the touch-based gesture. As noted above, in some instances the touch-based gestures are preconfigurable (e.g., by a user and/or automatically and without user intervention) to correspond to a variety of actions. Generally, the actions pertain to a computing task and/or initiation of functionality of the mobile device, such as to activate a particular application of the mobile device, reset the mobile device, place a call, etc. In one example, the touch-based gesture corresponds to an action to launch a particular user profile from a set of user profiles associated with the fingerprint identity information.

For instance, the user of the mobile device, e.g., the parent, may have several different user profiles associated with the mobile device, such as an "admin" user profile, a "child" user profile, and a "guest" user profile with differing access privileges and/or display settings. Each user profile can be associated with a particular touch-based gesture, such that receipt of the particular touch-based gesture (as well as fingerprint authentication) causes a user interface associated with the corresponding user profile to be displayed. Further, in various examples different spatial regions of the fingerprint sensor area are associated with the various user profiles. For example, a first region of the fingerprint sensor area is associated with the admin user profile, a second region of the fingerprint sensor area is associated with the child user profile, and a third region is associated with the guest user profile. Accordingly, touch-based gestures to the first region can initiate functionality particular to the admin user profile, touch-based gesture to the second region can initiate functionality particular to the child profile, and so forth.

In this example, the "C-shaped" gesture is associated with a child user profile that restricts access to one or more features of the mobile device and has "child-friendly" display settings. Accordingly, the mobile device initiates display of a customized user interface based on the child user profile, e.g., to display the child's favorite show while restricting access to call, text messaging, social media, and internet functionality of the mobile device. In this way, the techniques described herein enable secure and efficient initiation of various functionality of the mobile device based on fingerprint encoded touch-based gestures.

While features and concepts of fingerprint encoded gesture initiation of device actions can be implemented in any number of environments and/or configurations, aspects of fingerprint encoded gesture initiation of device actions are described in the context of the following example systems, devices, and methods.

FIG. 1 illustrates an example environment 100 in which aspects of fingerprint encoded gesture initiation of device actions can be implemented. The environment 100 includes a computing device such as a mobile device 102 that can be carried by a user, such as a smartphone, a tablet device, a laptop, a wearable computing device, (e.g., a smartwatch or a fitness tracker), augmented reality ("AR) and/or virtual reality ("VR") devices (e.g., AR/VR glasses, projectors, headsets, etc.), and so forth. These examples are not to be construed as limiting, however, and the mobile device 102 can be implemented in a variety of different ways and form factors. Further example attributes of the mobile device 102 are discussed below with reference to the device 1000 of FIG. 10.

The mobile device 102 includes various functionality that enables the mobile device 102 to perform different aspects of fingerprint encoded gesture initiation of device actions discussed herein, including a connectivity module 104, content capture devices 106 including cameras 108 and audio capture devices 110, a display device 112 including a user interface 114 and a fingerprint sensor area 116, and a content control module 118. The connectivity module 104 represents functionality (e.g., logic and hardware) for enabling the mobile device 102 to interconnect with other devices, databases, storage systems, and/or networks, such as via a network 120. The connectivity module 104, for instance, enables wireless and/or wired connectivity of the mobile device 102 as well as accessing content stored remotely, for instance "in the cloud."

The content capture devices 106 are representative of functionality to enable various types of media to be captured via the mobile device 102, such as visual media and audio media. In this particular example the content capture devices 106 include photo/video capture devices such as cameras 108 and audio capture devices 110. The content capture devices 106 can include a variety of devices that are able to capture various types of media in accordance with the implementations discussed herein. The content capture devices 106, for instance, include not only hardware for capturing associated media but also logic (e.g., drivers, firmware, etc.) for operating and configuring operation of the associated content capture devices 106. The display device 112 represents functionality (e.g., hardware and logic) for enabling visual output via the mobile device 102. For instance, via the user interface 114.

The fingerprint sensor area 116 represents functionality for detecting attributes of a user's digits, e.g., one or more of the user's fingers including the user's thumb, such as for detecting physical characteristics of the user's fingerprint. The fingerprint sensor area 116, for instance, is operable to detect a pattern of a fingerprint in contact with the fingerprint sensor area 116 such as to perform fingerprint authentication. Fingerprint authentication, for example, determines whether a fingerprint detected in contact with the fingerprint sensor area 116 matches a particular user identity, e.g., a user of the mobile device 102. In various examples, the fingerprint sensor area 116 is integrated into, above, and/or below the display device 112. The fingerprint sensor area 116 can be a variety of sizes, such as a size of the display device 112. Alternatively or additionally, the fingerprint sensor area 116 is one or more portions of the display device 112.

The content control module 118 represents functionality for performing various aspects of fingerprint encoded gesture initiation of device actions described herein and is illustrated as including an identity module 122, a gesture module 124, and a profile module 126. The content control module 118 is operable to receive an input including a touch-based gesture. As described herein, a touch-based gesture includes one or more "touches" and/or strokes to the fingerprint sensor area 116. In various examples, the identity module 122 is employed to generate fingerprint identity information from the touch-based gesture and authenticate a user identity based on the fingerprint identity information. The gesture module 124 is employed to determine one or more actions to perform based on the touch-based gesture, such as to activate a particular application of the mobile device 102, reset the mobile device 102, place a call from the mobile device 102, etc. In one example, the content control module 118 includes a profile module 126 that is operable to determine a particular user profile associated with the fingerprint identity information based on the touch-based gesture, and the action includes initiating display of a customized user interface based on the particular user profile.

Example operations of fingerprint encoded gesture initiation of device actions are illustrated in FIG. 1. In the example, the mobile device 102 receives input including a touch-based gesture, such as an "s-shaped" stroke to the fingerprint sensor area 116. The mobile device 102 generates fingerprint identity information based on the input, and determines that the fingerprint identity information is associated with a user of the mobile device 102. Responsive to authentication of the fingerprint identity information, the mobile device 102 determines a user profile from a set of user profiles associated with the user based on the touch-based gesture. For instance, the "S-shaped" gesture is associated with an admin profile. Thus, the mobile device 102 initiates display of a customized user interface corresponding to the admin profile. Accordingly, the techniques described herein enable secure and efficient initiation of various functionality of the mobile device based on fingerprint encoded touch-based gestures. Having discussed an example environment in which the disclosed techniques can be performed, consider now some example scenarios and implementation details for implementing the disclosed techniques.

Figure 2:
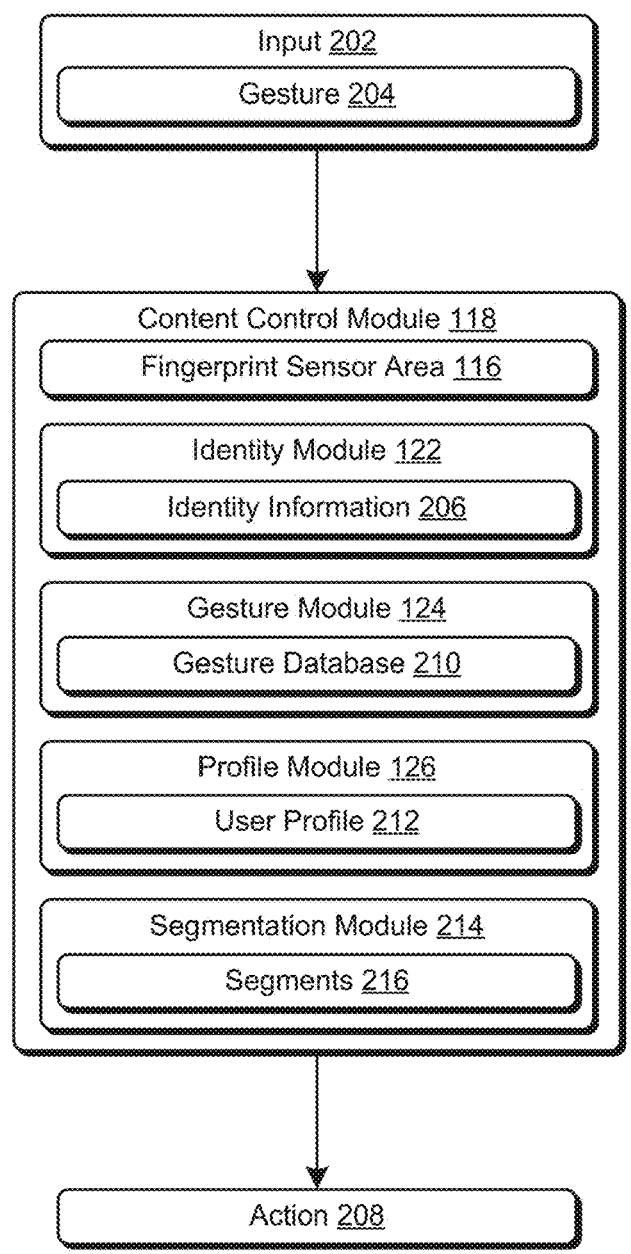
FIG. 2 illustrates an example system for fingerprint encoded gesture initiation of device actions in accordance with one or more implementations.

FIG. 2 depicts an example system 200 for fingerprint encoded gesture initiation of device actions in accordance with one or more implementations. The system 200 can be implemented in the environment 100 and incorporates attributes of the environment 100 introduced above. In the example system 200, the content control module 118 receives an input 202 including a gesture 204, such as a touch-based gesture. Generally, the gesture 204 includes one or more "touches" and/or strokes to a fingerprint sensor area 116. For example, the gesture 204 is defined by a shape of a user stroke to the fingerprint sensor area 116 such as a pattern, letter, number, etc. The user stroke can be continuous, e.g., defined by an "uninterrupted" contact with the fingerprint sensor area 116.

The gesture 204 can also include multiple strokes made by one or more digits of a user. In some implementations, the gesture 204 includes a sequence of strokes and/or string-based input, e.g., a gesture 204 includes a user input to "write" a word. The gestures 204 are further definable by a variety of additional properties, such as a temporal property (e.g., how "fast" or "slow" a user stroke is), a width property, a pressure property (e.g., how "hard" a user touch to define a stroke is), etc. As further described below, in various examples one or more gestures 204 can be configured to correspond to a variety of device actions, operations, and/or user profiles. In various examples, the input 202 is received while the mobile device 102 is in a "locked" state, e.g., is displaying a lock screen by a display device 112.

The content control module 118 includes an identity module 122 that is operable to generate identity information 206 such as fingerprint identity information based on the input 202. The identity information 206, for instance, identifies attributes such as physical characteristics of one or more of a user's digits. Accordingly, the identity module 122 can leverage the fingerprint sensor area 116 to detect a pattern of a fingerprint in contact with the fingerprint sensor area 116 such as to perform fingerprint authentication. Fingerprint authentication is used to determine an identity associated with a particular fingerprint detected in contact with the fingerprint sensor area 116 such as to determine if the particular fingerprint matches a particular user identity, e.g., a user of the mobile device 102.

In various examples, the identity module 122 samples different spatial locations of the gesture 204 to extract a number of instances of user fingerprint data. For example, the identity module 122 collects fingerprint data from a "start" of a user stroke that defines a gesture 204, fingerprint data from an "end" of the stroke, and several instances of fingerprint data "in between" the start and end of the stroke. The identity module 122 can then compare the instances of user fingerprint data to one another as part of generating the identity information 206. In at least one implementation, the identity module 122 may also leverage one or more cameras 108 to perform facial recognition strategies to determine if facial features match a user identity associated with the identity information 206.

The identity module 122 is thus operable to determine whether the identity information 206 is associated with a particular user of the mobile device 102. In one example, the identity module 122 determines that the identity information 206 is not associated with the user of the mobile device 102 and thus prohibits functionality of the mobile device 102, e.g., to prohibit performance of one or more mobile device 102 actions. Alternatively, the identity module 122 determines that the identity information 206 is associated with a known user, e.g., a user of the mobile device 102, and initiates gesture recognition to perform a subsequent action.

For instance, the content control module 118 includes a gesture module 124 that is operable to determine an action 208 that corresponds to the gesture 204. For instance, one or more properties of the gesture 204 correspond to a particular action 208, such as a shape of the gesture 204, a size of the gesture 204, input properties of the gesture 204 (e.g., a duration of a stroke used to define the gesture 204), etc. By way of example, an "S-shaped" gesture 204 corresponds to a first action, while a "star-shaped" gesture 204 corresponds to a second action different from the first action. In another example, a relatively "quickly" drawn gesture 204 corresponds to a first action, while a slowly drawn gesture 204 may correspond to a second action different from the first action. In some examples, the action 208 is based in part or in whole on a spatial region of the fingerprint sensor area 116 that the gesture 204 is located as further described below.

In various examples, the gesture module 124 includes gesture database 210 that stores one or more gestures 204 that correspond to one or more actions 208. The correspondence between a particular gesture 204 and an action 208 may be user defined and/or defined automatically without user intervention. In some implementations, the gesture module 124 is operable to automatically infer one or more actions 208 based on the gesture 204. By way of example, the gesture 204 includes a sequence of strokes, such as a touch-based user input to "write out" one or more words. For instance, a user interacts with the fingerprint sensor area 116 to write out "camera". The gesture module 124 is operable to infer an action 208 that corresponds to the gesture 204, such as to launch a camera application of the mobile device 102.

Generally, the action 208 pertains to a computing task and/or initiation of functionality of the mobile device 102, such as to activate a particular application of the mobile device 102, reset the mobile device 102, unlock the mobile device 102, place a call, etc. In some examples, the action 208 corresponds to initiation of various hardware functionalities of the mobile device 102 such as to activate, deactivate, and/or adjust various properties of components of the mobile device 102 such as the cameras 108, audio capture devices 110, fingerprint sensor area 116, etc. For example, receipt of a particular gesture 204 may correspond to an action to adjust (e.g., increase or decrease) a sensitivity of the fingerprint sensor area 116. This is by way of example and not limitation, and a variety of actions are considered.

In one example, the gesture 204 corresponds to an action to launch (e.g., unlock the mobile device and initiate display of) a particular user profile 212 from a set of user profiles associated with the identity information 206. For instance, the content control module 118 includes a profile module 126 that is operable to determine a set of user profiles that correspond to the identity information 206. Each user profile 212 is associated with a customized user interface, e.g., with particular visual properties, that enables and/or restricts access to various features and/or functionality of the mobile device 102, with user specific display settings, etc. In one example, a user interface associated with a particular user profile includes a setting to display large text, such as to accommodate for a user's limited vision. From the set of user profiles, the profile module 126 can determine one or more user profiles 212 based on the gesture 204.

By way of example, the identity information 206 is associated with a particular user of the mobile device 102. The particular user is associated with several different user profiles, such as an admin user profile that permits unrestricted use of the mobile device 102 and a limited user profile that restricts access to one or more features/functionality of the mobile device 102. The content control module 118 leverages the profile module 126 to determine one or more of the user profiles 212 that correspond to a particular gesture 204. For instance, a first gesture corresponds to an action to launch a user interface associated with the admin user profile while a second gesture corresponds to an action to launch a user interface associated with the limited user profile. Accordingly, upon receipt of the gesture 204, the content control module 118 is operable to initiate display of a customized user interface based on the corresponding user profile. Thus, the techniques described herein support secure initiation of a variety of actions 208 in an efficient manner, such as based on various properties of gestures 204.

Additionally, in some examples the content control module 118 includes a segmentation module 214 that can segment the fingerprint sensor area 116 into various segments 216, e.g., different spatial regions. The segmentation module 214 is further operable to associate the segments 216 with different user profiles 212 from the set of user profiles. For example, the segmentation module 214 is operable to segment the fingerprint sensor area 116 into a first segment, e.g., a first spatial region, and a second segment, e.g., a second spatial region. The segmentation module 214 further associates a first user profile with the first segment and a second user profile with the second segment. In this example, the mobile device 102 receives a gesture 204 to the first segment of the fingerprint sensor area 116. Accordingly, the mobile device 102 is operable to perform an action 208 that corresponds to the gesture 204 and is based in part on the first user profile. Similarly, the mobile device 102 performs an action 208 that corresponds to the gesture 204 and is based on the second user profile responsive to receipt of a gesture 204 to the second segment.

In an additional or alternative example, a size of a segment 216 corresponds to a frequency of use of a particular user profile 212. For instance, the segmentation module 214 generates a relatively large segment 216 for a frequently used user profile 212 and generates a smaller segment 216 to correspond to a non-frequently accessed user profile 212. This is by way of example and not limitation, and the segmentation module 214 can segment the fingerprint sensor area 116 into two or more segments 216 with a variety of sizes and shapes based on a variety of considerations. Accordingly, the techniques described herein support intuitive control over user profile specific functionality based on a spatial location that a gesture 204 is located, as well as the gesture 204 itself.

Figure 3:
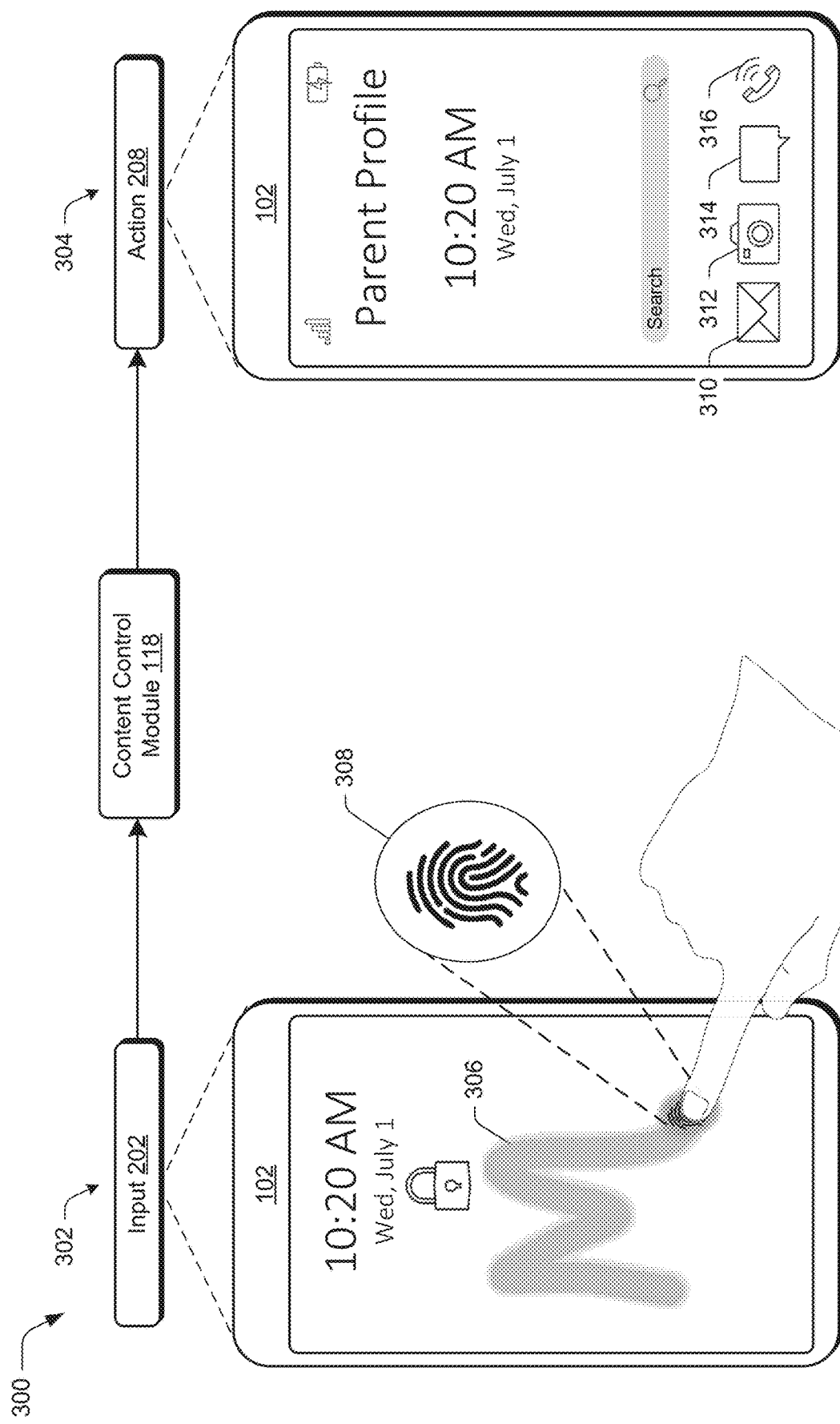
FIG. 3 illustrates an example implementation for fingerprint encoded gesture initiation of device actions in which a gesture corresponds to a parent profile in accordance with one or more implementations.

FIG. 3 depicts an example implementation 300 for fingerprint encoded gesture initiation of device actions in which a gesture corresponds to a parent profile in accordance with one or more implementations. In this example, shown in first stage 302 and second stage 304, a content control module 118 of a mobile device 102 is operable to receive an input 202 including a gesture 204. As shown in first stage 302, the mobile device 102 is in a "lock mode," for instance displaying a lock screen. The mobile device 102 receives a touch-based user input to the fingerprint sensor area 116 such as the gesture 204 which includes an "M" shaped stroke 306.

Based on the input 202, the content control module 118 is operable to generate identity information 206 and determine that the identity information 206 is associated with a user of the mobile device 102, such as by fingerprint authentication of a fingerprint 308. Although a single fingerprint 308 is depicted, in various examples the fingerprint authentication leverages multiple instances of fingerprint data to perform the authentication as described above. The content control module 118 then determines a set of user profiles associated with the user of the mobile device 102. Based on the gesture 204, e.g., the M-shaped stroke 306, the content control module 118 determines a user profile 212 from the set of user profiles. In this example, the M-shaped stroke 306 corresponds to a "parent" profile, e.g., with unrestricted access to functionality of the mobile device 102.

As shown in second stage 304, the mobile device 102 performs an action 208 responsive to receipt of the fingerprint encoded gesture 204, such as to "unlock" the mobile device 102. Further, the mobile device 102 displays a customized user interface based on the parent profile that provides access to various features and functionality of the mobile device such as an email application 310, a photography application 312, a messaging application 314, and a phone application 316. Accordingly, the user is able to leverage the techniques described herein to unlock the mobile device 102 securely and efficiently and display a customized user interface based on the gesture 204.

Figure 4:
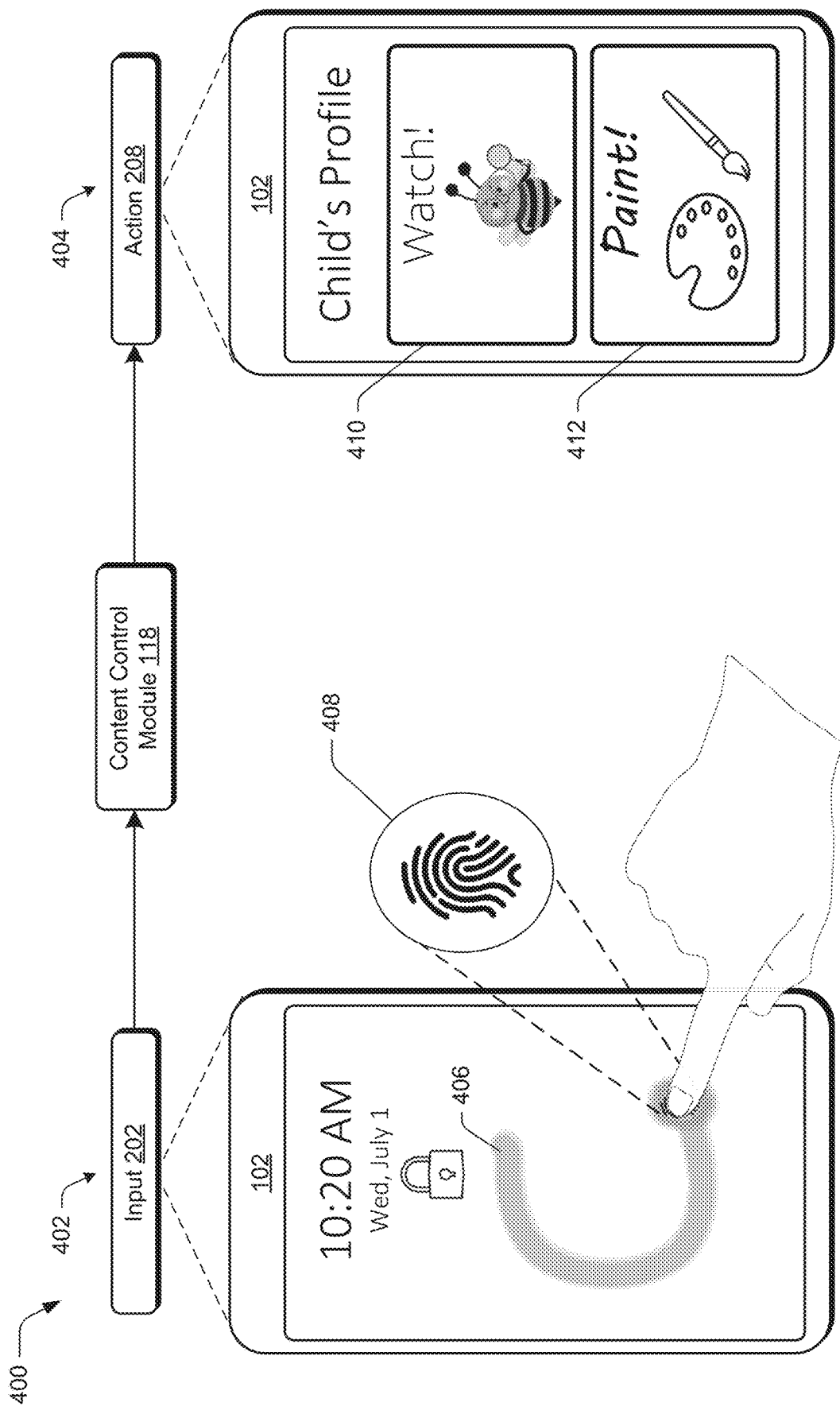
FIG. 4 illustrates an example implementation for fingerprint encoded gesture initiation of device actions in which a gesture corresponds to a child profile in accordance with one or more implementations.

FIG. 4 depicts an example implementation 400 for fingerprint encoded gesture initiation of device actions in which a gesture corresponds to a child profile in accordance with one or more implementations. In this example, shown in a first stage 402 and a second stage 404, a content control module 118 of a mobile device 102 is operable to receive an input 202 including a gesture 204. As shown in first stage 402, the mobile device 102 is in a locked state, for instance displaying a lock screen. The mobile device 102 receives a touch-based user input to the fingerprint sensor area 116 such as the gesture 204 which includes a "C" shaped stroke 406.

Based on the input 202, the content control module 118 is operable to generate identity information 206 and determine that the identity information 206 is associated with a user of the mobile device 102, such as by fingerprint authentication of a fingerprint 408. The content control module 118 determines a set of user profiles associated with the user of the mobile device 102. Consider that in this example, the user is the same user of the mobile device 102 as described above with respect to FIG. 3, and the set of user profiles includes a parent profile and a child profile. Based on the gesture 204, e.g., the C-shaped stroke 406, the content control module 118 determines a user profile 212 from the set of user profiles. Whereas the M-shaped stroke 306 corresponds to a "parent" profile, the C-shaped stroke 406 instead corresponds to a child profile that restricts access to one or more features of the mobile device 102.

As shown in second stage 404, the mobile device 102 performs an action 208 responsive to receipt of the fingerprint encoded gesture 204, such as to transition the mobile device 102 to an unlocked state and display a customized user interface based on the child profile. The customized user interface, for instance, limits functionality of the mobile device 102 to a children's video application 410 and a painting application 412. The customized user interface further includes a simple display, such that a child would be able to operate the mobile device 102 to select the children's video application 410 and/or the painting application 412.

Figure 5:
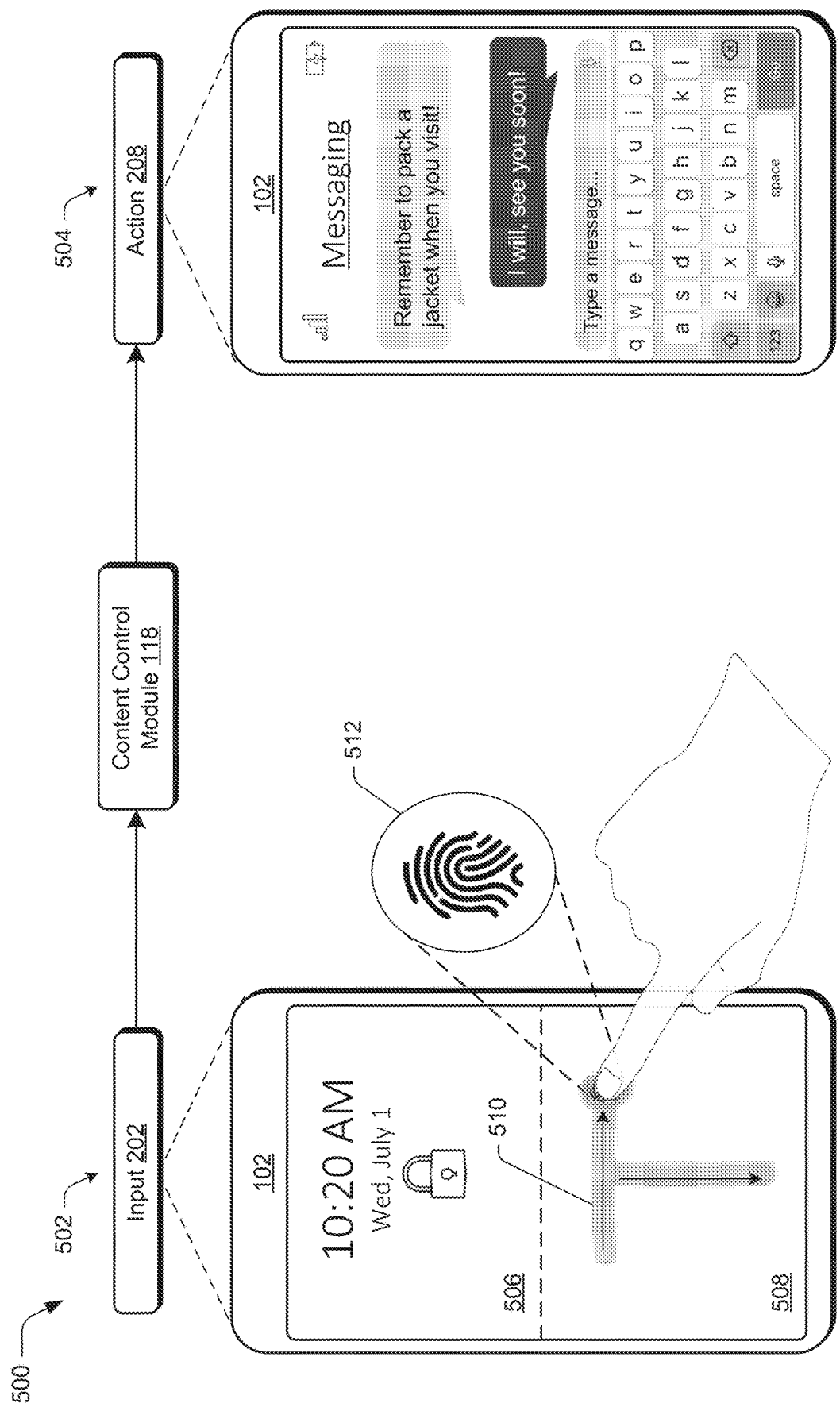
FIG. 5 illustrates an example implementation for fingerprint encoded gesture initiation of device actions in which an action is based in part on a touch-based gesture to a particular spatial region of a fingerprint sensor area in accordance with one or more implementations.

FIG. 5 depicts an example implementation 500 for fingerprint encoded gesture initiation of device actions in which an action is based in part on a touch-based gesture to a particular spatial region of a fingerprint sensor area in accordance with one or more implementations. In this example, shown in a first stage 502 and a second stage 504, a content control module 118 of a mobile device 102 is operable to segment the fingerprint sensor area 116 into different spatial regions, e.g., a top spatial region 506 and a bottom spatial region 508. The top spatial region 506 corresponds to a limited profile, e.g., a child user profile, while the bottom spatial region 508 corresponds to an admin user profile, e.g., a parent user profile.

As shown in first stage 502, the mobile device 102 receives an input 202 including a gesture 204 to the bottom spatial region 508. The gesture 204 includes two separate strokes to form a T-shaped stroke 510. Based on the input 202, the content control module 118 is operable to generate identity information 206 and verify that the identity information 206 is associated with a user of the mobile device 102. For instance, the mobile device 102 performs fingerprint authentication of one or more fingerprints obtained by the fingerprint sensor area 116, such as a fingerprint 512. The content control module 118 determines a user profile 212 based on the spatial region of the fingerprint sensor area that the gesture 204 is located, which in this example is the bottom spatial region 508 that corresponds to the parent user profile.

As shown in second stage 504, the content control module 118 performs an action 208 that corresponds to the gesture 204 that is particular to the parent profile. For instance, the T-shaped stroke 510 corresponds to an action to launch a text-messaging application within a customized user interface associated with the parent profile. Thus, in this example the spatial location of the gesture 204 controls a user profile to be displayed, and the shape of the gesture 204 controls an action to be performed within the parent profile.

Figure 6:
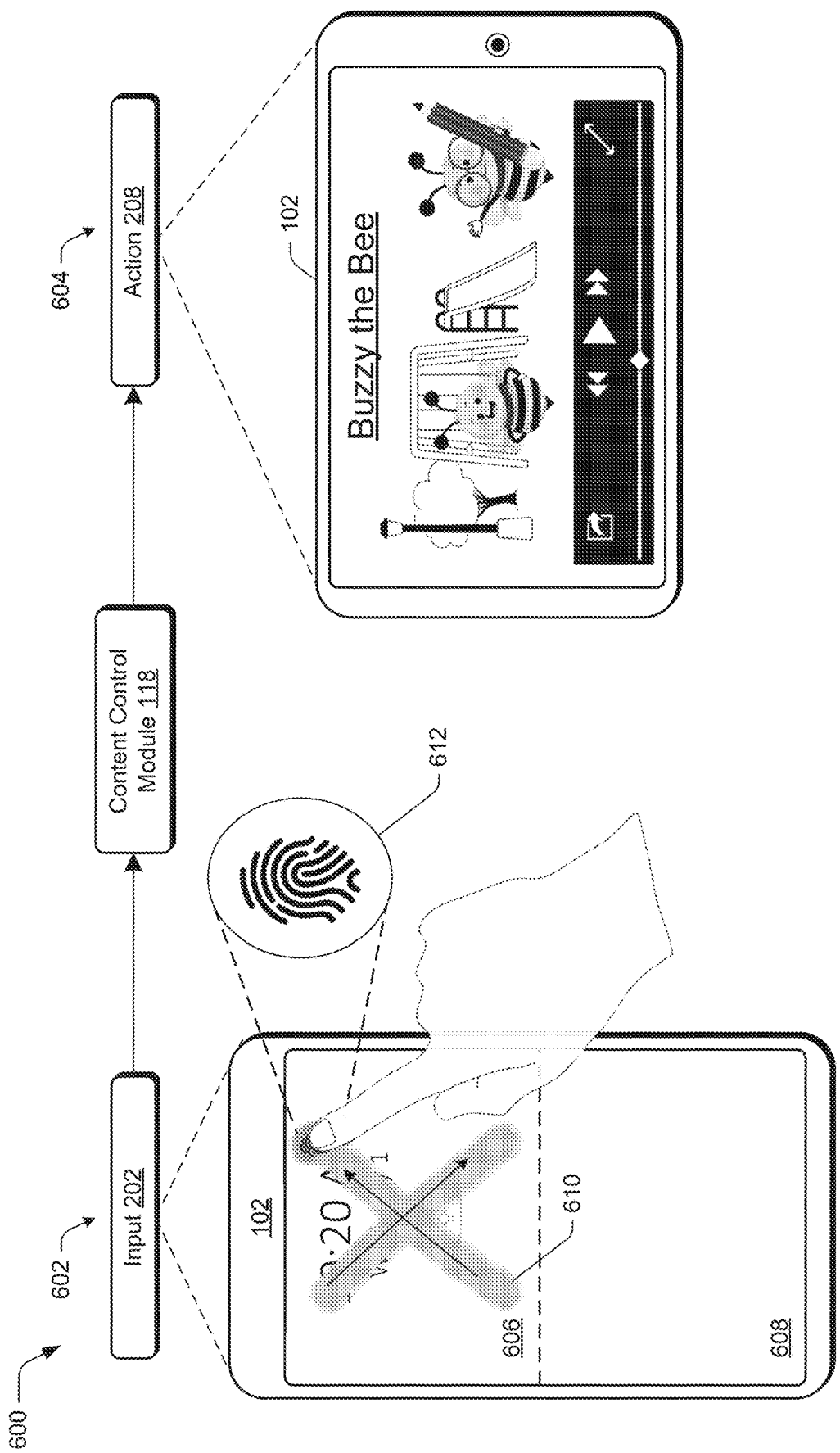
FIG. 6 illustrates an additional example implementation for fingerprint encoded gesture initiation of device actions in which an action is based in part on a touch-based gesture to a particular spatial region of a fingerprint sensor area in accordance with one or more implementations.

FIG. 6 depicts an additional example implementation 600 for fingerprint encoded gesture initiation of device actions in which an action is based in part on a touch-based gesture to a spatial region of a fingerprint sensor area in accordance with one or more implementations. In this example, shown in first stage 602 and second stage 604, the content control module 118 is operable to segment the fingerprint sensor area 116 into different spatial regions, such as a top spatial region 606 and a bottom spatial region 608. Similar to the example above in FIG. 5, the top spatial region 606 corresponds to a limited profile, e.g., a child user profile, while the bottom spatial region 608 corresponds to an admin user profile, e.g., a parent user profile.

As shown in first stage 602, the mobile device 102 receives an input 202 including a gesture 204 to the top spatial region 606. The gesture 204 includes two separate strokes to form an X-shaped stroke 610. Based on the input 202, the content control module 118 is operable to generate identity information 206 and determine that the identity information 206 is associated with a user of the mobile device 102, such as by fingerprint authentication of one or more fingerprints obtained by the fingerprint sensor area 116 including a fingerprint 612. The content control module 118 determines a user profile 212 based on the spatial region of the fingerprint sensor area that the gesture 204 is located, which in this example is the top spatial region 606 that corresponds to the child user profile.

As shown in second stage 604, the content control module 118 performs an action 208 that corresponds to the gesture 204. For instance, the X-shaped stroke 610 corresponds to an action 208 to launch a video application. Because the gesture 204 is located in the top spatial region 606, the action 208 is particular to the child profile. Accordingly, the video application is launched to display a children's show, e.g. "Buzzy the Bee." Thus, the techniques described herein enable efficient and secure initiation of a variety of user specific actions.

Figure 7:
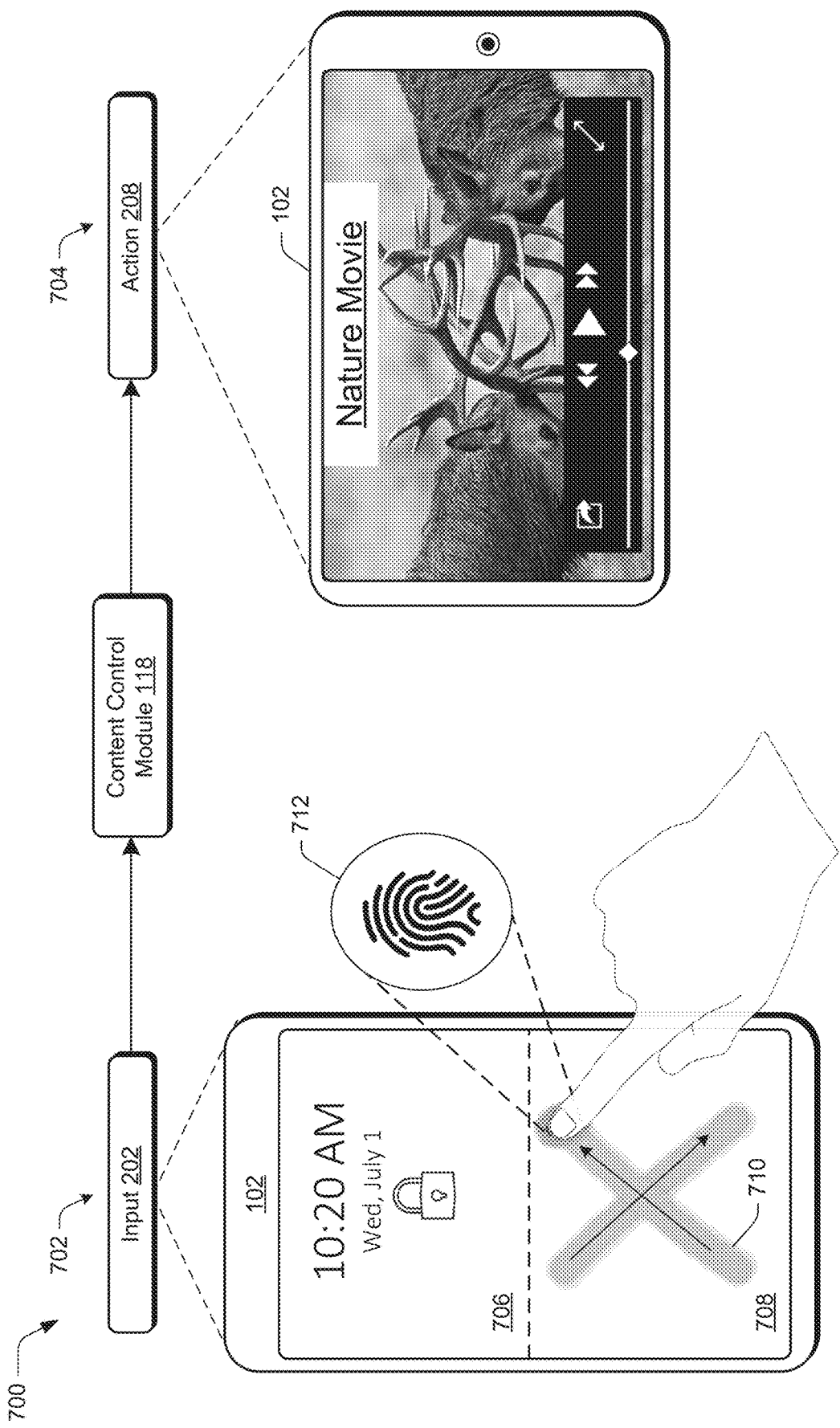
FIG. 7 illustrates an additional example implementation for fingerprint encoded gesture initiation of device actions in which an action is based in part on a touch-based gesture to a particular spatial region of a fingerprint sensor area in accordance with one or more implementations.

FIG. 7 an additional example implementation 700 for fingerprint encoded gesture initiation of device actions in which an action is based in part on a touch-based gesture to a spatial region of a fingerprint sensor area in accordance with one or more implementations. In this example, shown in first stage 702 and second stage 704, the content control module 118 is operable to segment the fingerprint sensor area 116 into different spatial regions, such as a top spatial region 706 and a bottom spatial region 708. Similar to the examples above in FIGS. 5 and 6, the top spatial region 706 corresponds to a limited profile, e.g., a child user profile, while the bottom spatial region 708 corresponds to an admin user profile, e.g., a parent user profile.

As shown in first stage 702, the mobile device 102 receives an input 202 including a gesture 204 to the bottom spatial region 708. The gesture 204 includes two separate strokes to form an X-shaped stroke 710. Based on the input 202, the content control module 118 is operable to authenticate the user of the mobile device 102 in accordance with the techniques described herein such as based on a fingerprint 712 obtained by the fingerprint sensor area 116. The content control module 118 determines a user profile 212 based on the spatial region of the fingerprint sensor area that the gesture 204 is located, which in this example is the bottom spatial region 708 that corresponds to the parent user profile.

As shown in second stage 704, the content control module 118 performs an action 208 that corresponds to the gesture 204. For instance, the X-shaped stroke 710 corresponds to an action 208 to launch a video application such as described above with respect to FIG. 6. Because the gesture 204 is located in the top spatial region 706, the action 208 is particular to the parent profile. Whereas in the example depicted in FIG. 6, the video application displayed a children's show, in this example the video application is launched to display a show that is of interest to the user of the mobile device 102, e.g., a nature movie for viewing by the parent. Thus, the techniques described herein enable efficient and secure initiation of a variety of user specific actions.

Figure 8:
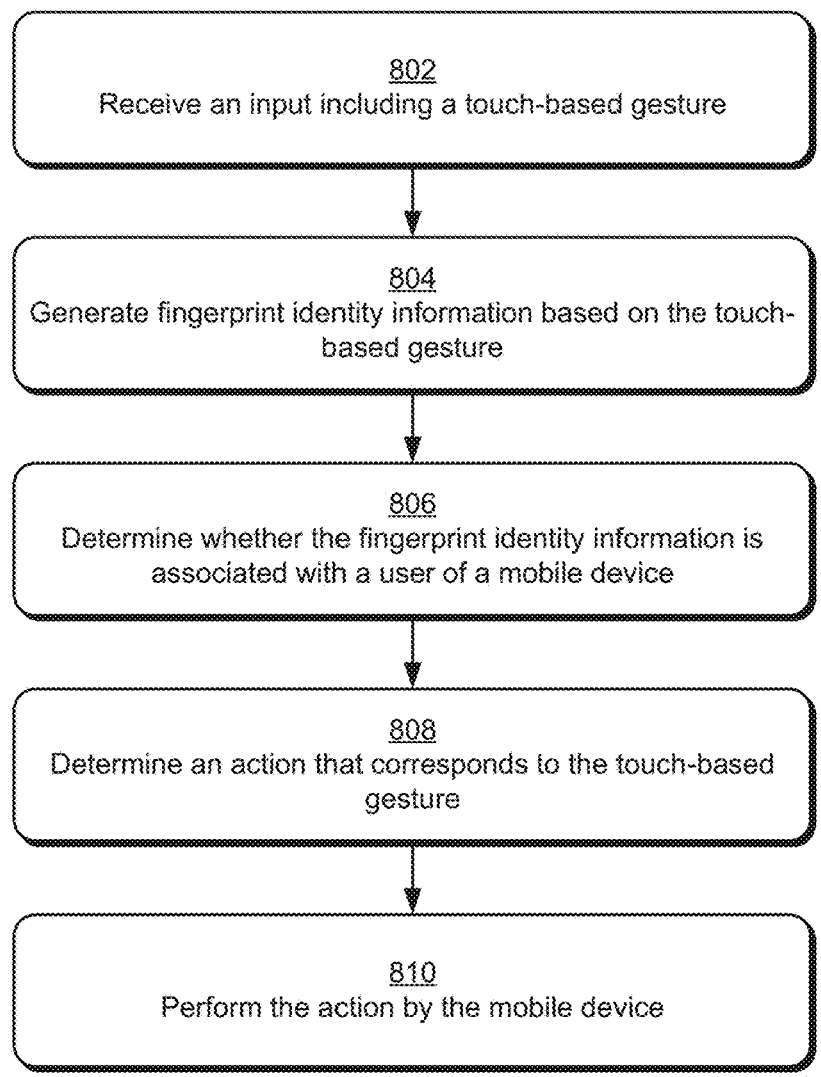
FIG. 8 illustrates a flow chart depicting an example method for fingerprint encoded gesture initiation of device actions in accordance with one or more implementations.

FIG. 8 illustrates a flow chart depicting an example method 800 for fingerprint encoded gesture initiation of device actions in accordance with one or more implementations. At 802, an input is received that includes a touch-based gesture. For instance, the touch-based gesture, e.g., a gesture 204, includes one or more "touches" and/or strokes to a fingerprint sensor area 116 of a mobile device 102. For example, the gesture 204 is defined by a shape of a user stroke to the fingerprint sensor area 116 such as a pattern, letter, number, etc. In some implementations, the gesture 204 includes a sequence of strokes and/or string-based input, e.g., a gesture 204 includes a user input to "write out" a word.

At 804, fingerprint identity information is generated based on the touch-based gesture. The identity information 206, for instance, identifies attributes such as physical characteristics of one or more of a user's digits. In various examples, the mobile device 102 samples different spatial locations of the gesture 204 to extract a number of instances of fingerprint data including user fingerprints to generate the identity information 206. The mobile device 102 may use the identity information 206 to perform fingerprint authentication, e.g., to identify a user associated with a touch input to the fingerprint sensor area 116.

At 806, a determination is made whether the fingerprint identity information is associated with a user of the mobile device. In one example, the identity module 122 determines that the identity information 206 is not associated with the user of the mobile device 102 and thus prohibits functionality of the mobile device 102, e.g., to prohibit performance of one or more mobile device 102 actions. Alternatively, the mobile device 102 verifies that the identity information 206 is associated with a known user, e.g., a user of the mobile device 102, and initiates gesture recognition to perform a subsequent action.

At 808, an action that corresponds to the touch-based gesture is determined. For example, one or more properties of the gesture 204 correspond to a particular action 208, such as a shape of the gesture 204, a size of the gesture 204, input properties of the gesture 204 (e.g., a duration of a stroke used to define the gesture 204), etc. In some examples, the action 208 is determined based in part or in whole on a spatial region of the fingerprint sensor area 116 that the gesture 204 is located.

Generally, the action 208 pertains to a computing task and/or initiation of functionality of the mobile device 102, such as to activate a particular application of the mobile device 102, reset the mobile device 102, unlock the mobile device 102, place a call, etc. In some examples, the action 208 corresponds to initiation of various hardware functionalities of the mobile device 102 such as to activate, deactivate, and/or adjust various properties of components of the mobile device 102 such as the cameras 108, audio capture devices 110, fingerprint sensor area 116, etc.

In one example, the gesture 204 corresponds to an action 208 to initiate display of a particular user profile 212 from a set of user profiles associated with the identity information 206. Accordingly, the mobile device 102 is configurable to determine a user profile 212 from a set of user profiles associated with the identity information 206 based on the gesture 204. In various examples, the user profile 212 is determined based in part or in whole on a spatial region of the fingerprint sensor area 116 that the gesture 204 is located.

At 810, the action is performed by the mobile device. In some implementations, the action 208 is performed responsive to a determination that the identity information 206 is associated with the user of the mobile device 102. In one example, performance of the action 208 includes display of a customized user interface based on a determined user profile 212 as further described below with respect to FIG. 9.

Figure 9:
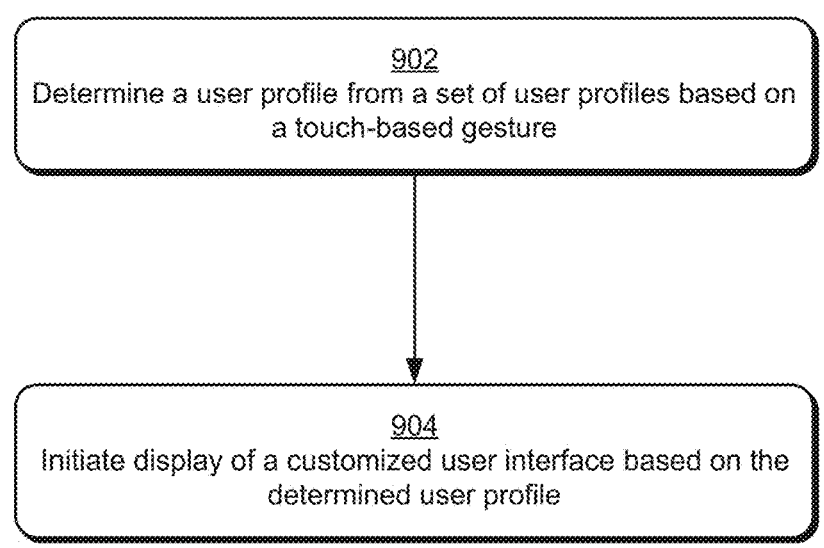
FIG. 9 illustrates a flow chart depicting an additional example method for fingerprint encoded gesture initiation of device actions including displaying a customized user interface in accordance with one or more implementations.

FIG. 9 illustrates a flow chart depicting an example method 900 for fingerprint encoded gesture initiation of device actions including displaying a customized user interface in accordance with one or more implementations. The method 900 can be performed in conjunction with the method 800 as described above. At 902, a user profile is determined from a set of user profiles based on a touch-based gesture received by a mobile device 102. The set of user profiles, for instance, is associated with fingerprint identity information generated based on the touch-based gesture, e.g., a gesture 204, in accordance with the techniques described above. In an example, a user associated with the fingerprint identity information is associated with several different user profiles 212. Each user profile 212 in the set of user profiles is associated with a gesture 204. Accordingly, based on one or more properties of the touch-based gesture (e.g., a shape of the touch-based gesture), the mobile device 102 determines a corresponding user profile 212.

At 904, display of a customized user interface is initiated based on the determined user profile. For instance, each user profile 212 in the set of user profiles is associated with a customized user interface, e.g., that has particular visual and/or audial properties, with user specific display settings, that enables and/or restricts access to various features and/or functionality of the mobile device 102, etc. Accordingly, based on a determination of a particular user profile, the mobile device 102 displays the corresponding customized user interface. For instance, an admin user profile permits unrestricted use of the mobile device 102 while a limited user profile restricts access to one or more features of the mobile device 102. In this way, the techniques described herein enable secure and efficient initiation of various functionality of the mobile device 102 based on fingerprint encoded touch-based gestures.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
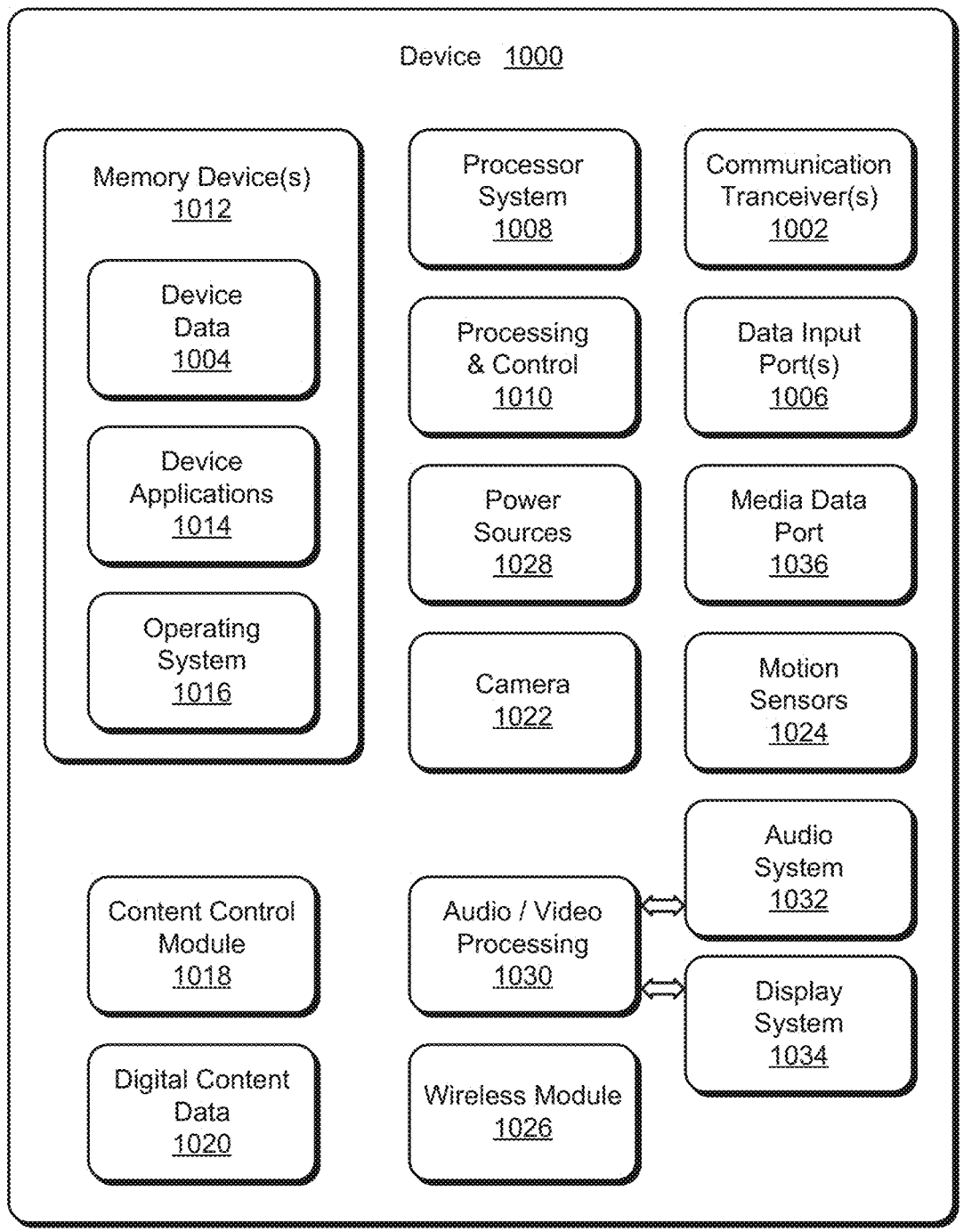
FIG. 10 illustrates various components of an example device in which aspects of fingerprint encoded gesture initiation of device actions can be implemented.

FIG. 10 illustrates various components of an example device 1000 in which aspects of fingerprint encoded gesture initiation of device actions can be implemented. The example device 1000 can be implemented as any of the devices described with reference to the previous FIGS. 1-9, such as any type of mobile device, mobile phone, mobile device, wearable device, tablet, computing, communication, entertainment, gaming, media playback, and/or other type of electronic device. For example, the mobile device 102 as shown and described with reference to FIGS. 1-9 may be implemented as the example device 1000.

The device 1000 includes communication transceivers 1002 that enable wired and/or wireless communication of device data 1004 with other devices. The device data 1004 can include any of device identifying data, device location data, wireless connectivity data, and wireless protocol data. Additionally, the device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes a content control module 1018 that implements aspects of fingerprint encoded gesture initiation of device actions and may be implemented with hardware components and/or in software as one of the device applications 1014. In an example, the content control module 1018 can be implemented as the content control module 118 described in detail above. In implementations, the content control module 1018 may include independent processing, memory, and logic components as a computing and/or electronic device integrated with the device 1000. The device 1000 also includes digital content data 1020 for implementing aspects of fingerprint encoded gesture initiation of device actions and may include data from and/or utilized by the content control module 1018.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the mobile device 102, the wireless module 1026 can be leveraged to scan for and detect wireless networks, as well as negotiate wireless connectivity to wireless networks for the mobile device 102. The device 1000 can also include one or more power sources 1028, such as when the device is implemented as a mobile device. The power sources 1028 may include a charging and/or power system, and can be implemented as a flexible strip battery, a rechargeable battery, a charged super-capacitor, and/or any other type of active or passive power source.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of fingerprint encoded gesture initiation of device actions have been described in language specific to features and/or methods, the subject of the appended claims is not necessarily limited to the specific features or methods described. Rather, the features and methods are disclosed as example implementations of fingerprint encoded gesture initiation of device actions, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a display screen with an integrated fingerprint sensor area; and a content control module implemented at least partially in hardware and configured to: receive, by the integrated fingerprint sensor area, an input including a touch-based gesture: generate fingerprint identity information based on the input: determine that the fingerprint identity information is associated with a user of the computing device; determine a user profile from a set of user profiles associated with the fingerprint identity information based on the touch-based gesture; and initiate display of a customized user interface based on the determined user profile.

In some aspects, the techniques described herein relate to a computing device, wherein the integrated fingerprint sensor area is a size of the display screen.

In some aspects, the techniques described herein relate to a computing device, wherein the touch-based gesture corresponds to an admin user profile that permits unrestricted use of the computing device.

In some aspects, the techniques described herein relate to a computing device, wherein the touch-based gesture corresponds to a limited user profile that restricts access to one or more features of the computing device.

In some aspects, the techniques described herein relate to a computing device, wherein the touch-based gesture is defined by a shape of a continuous user stroke to the integrated fingerprint sensor area.

In some aspects, the techniques described herein relate to a computing device, wherein the input is received while the computing device is in a locked state and to initiate display of the customized user interface includes causing the computing device to transition to an unlocked state.

In some aspects, the techniques described herein relate to a computing device, wherein the content control module is further configured to validate the fingerprint identity information against a facial profile of the user using facial recognition techniques.

In some aspects, the techniques described herein relate to a computing device, wherein to generate the fingerprint identity information includes sampling the touch-based gesture at a plurality of locations to extract instances of fingerprint data and comparing the instances of fingerprint data to one another.

In some aspects, the techniques described herein relate to a method, including: receiving, by a fingerprint sensor area of a mobile device, an input including a touch-based gesture: generating fingerprint identity information based on the touch-based gesture: determining whether the fingerprint identity information is associated with a user of the mobile device; determining an action that corresponds to a shape of the touch-based gesture; and performing the action by the mobile device responsive to a determination that the fingerprint identity information is associated with the user of the mobile device.

In some aspects, the techniques described herein relate to a method, wherein the action includes initiating display of a customized user interface associated with a user profile that corresponds to the shape of the touch-based gesture.

In some aspects, the techniques described herein relate to a method, wherein the action includes one or more of placing a call, launching a particular application of the mobile device, or resetting the mobile device.

In some aspects, the techniques described herein relate to a method, wherein the action is preconfigured by the user of the mobile device to correspond to the shape of the touch-based gesture.

In some aspects, the techniques described herein relate to a method, wherein the action is determined based in part on a spatial region of the fingerprint sensor area that the touch-based gesture is located.

In some aspects, the techniques described herein relate to a method, further including determining that the fingerprint identity information is not associated with the user of the mobile device and prohibiting performance of the action based on the determination that the fingerprint identity information is not associated with the user of the mobile device.

In some aspects, the techniques described herein relate to a method, wherein to generate the fingerprint identity information includes sampling the touch-based gesture at a plurality of locations to extract instances of fingerprint data and comparing the instances of fingerprint data to one another.

In some aspects, the techniques described herein relate to a system, including: one or more processors; and one or more computer-readable storage media storing instructions that are executable by the one or more processors to: receive, by a fingerprint sensor area of a mobile device, an input including a touch-based gesture; generate fingerprint identity information based on the touch-based gesture: verify that the fingerprint identity information is associated with a user of the mobile device; determine, responsive to verification of the fingerprint identity information, a user profile based on a spatial region of the fingerprint sensor area that the touch-based gesture is located; and perform an action by the mobile device that corresponds to the touch-based gesture and is based in part on the user profile.

In some aspects, the techniques described herein relate to a system, wherein the action includes initiating display of a customized user interface by the mobile device based on the determined user profile.

In some aspects, the techniques described herein relate to a system, wherein the fingerprint sensor area includes a first spatial region that is associated with a first user profile and at least one additional spatial region different from the first spatial region that is associated with at least one additional user profile.

In some aspects, the techniques described herein relate to a system, wherein the spatial region of the fingerprint sensor area corresponds to an admin user profile that permits unrestricted use of the mobile device and the action that corresponds to the touch-based gesture is an operation to launch a particular application of the mobile device.

In some aspects, the techniques described herein relate to a system, wherein the spatial region of the fingerprint sensor area corresponds to a limited user profile that restricts access to one or more features of the mobile device and the action that corresponds to the touch-based gesture is an operation to launch a particular application of the mobile device that is not restricted.

The invention claimed is:

1. A computing device, comprising:
a display screen with an integrated fingerprint sensor area; and
a content control module implemented at least partially in hardware and configured to:
   segment the integrated fingerprint sensor area of the computing device into two or more segments, each segment associated with a respective user profile;
   receive, by the integrated fingerprint sensor area, an input including a touch-based gesture to a particular segment of the two or more segments that includes a sequence of strokes to define a text string-based input;
   generate fingerprint identity information based on the input by sampling two or more instances of fingerprint data at two or more spatial locations of the sequence of strokes and comparing the two or more instances of fingerprint data to one another;
   determine that the fingerprint identity information is associated with a user of the computing device;
   determine a user profile from a set of user profiles associated with the fingerprint identity information based on the touch-based gesture and the particular segment of the two or more segments;
   infer an action for performance by the computing device based on the text string-based input defined by the sequence of strokes, the touch-based gesture being located within the particular segment, and the determined user profile; and
   perform the action by the computing device, the action particular to the determined user profile.

2. The computing device as described in claim 1, wherein the integrated fingerprint sensor area is a size of the display screen.

3. The computing device as described in claim 1, wherein the touch-based gesture corresponds to an admin user profile that permits unrestricted use of the computing device.

4. The computing device as described in claim 1, wherein the touch-based gesture corresponds to a limited user profile that restricts access to one or more features of the computing device.

5. The computing device as described in claim 1, wherein the touch-based gesture is defined by a shape of a continuous user stroke to the integrated fingerprint sensor area.

6. The computing device as described in claim 1, wherein the input is received while the computing device is in a locked state and the action includes causing the computing device to transition to an unlocked state.

7. The computing device as described in claim 1, wherein the content control module is further configured to validate the fingerprint identity information against a facial profile of the user using facial recognition techniques.

8. A method, comprising:
segmenting, automatically and without user intervention, a fingerprint sensor area of a mobile device into two segments, the two segments including a first segment associated with a first user profile and a second segment associated with a second user profile, a size of the first segment and a size of the second segment based on a frequency of use of the first user profile relative to a frequency of use of the second user profile;
receiving, by the fingerprint sensor area of the fall mobile device, an input including a touch-based gesture to the first segment;
generating fingerprint identity information based on the touch-based gesture;
determining whether the fingerprint identity information is associated with a user of the mobile device;
determining an action for performance by the mobile device, the action based on a shape of the touch-based gesture, the touch-based gesture being located within the first segment, and the first user profile associated with the first segment; and
performing the action by the mobile device responsive to a determination that the fingerprint identity information is associated with the user of the mobile device.

9. The method as described in claim 8, wherein the action includes initiating display of a customized user interface associated with the first user profile that corresponds to the shape of the touch-based gesture.

10. The method as described in claim 8, wherein the action includes one or more of placing a call, launching a particular application of the mobile device, or resetting the mobile device.

11. The method as described in claim 8, wherein the action is preconfigured by the user of the mobile device to correspond to the shape of the touch-based gesture.

12. The method as described in claim 8, further comprising determining that the fingerprint identity information is not associated with the user of the mobile device and prohibiting performance of the action based on the determination that the fingerprint identity information is not associated with the user of the mobile device.

13. The method as described in claim 8, wherein to generate the fingerprint identity information includes sampling the touch-based gesture at a plurality of locations to extract instances of fingerprint data and comparing the instances of fingerprint data to one another.

14. A system, comprising:
one or more processors; and
one or more computer-readable storage media storing instructions that are executable by the one or more processors to:
segment, automatically by the one or more processors, a fingerprint sensor area of a mobile device into a first segment associated with an admin user profile and a second segment associated with a limited user profile, a size of the first segment based on a frequency of use of the admin user profile relative to a frequency of use of the limited user profile;
receive, by a fingerprint sensor area of a mobile device, an input including a touch-based gesture to the first segment;
generate fingerprint identity information based on the touch-based gesture;
verify that the fingerprint identity information is associated with a user of the mobile device;
determine an action for performance by the mobile device, the action based on a shape of the touch-based gesture, the touch-based gesture being located within the first segment, and an association with the admin user profile; and
perform, responsive to verification of the fingerprint identity information, the action by the mobile device.

15. The system as described in claim 14, wherein the action includes initiating display of a customized user interface by the mobile device based on the admin first-user profile.

16. The system as described in claim 14, wherein the admin user profile permits unrestricted use of the mobile device and the action is an operation to launch a particular application of the mobile device.

17. The computing device as described in claim 1, wherein the content control module is configured to sample an instance of fingerprint data from a start of a stroke of the sequence of strokes, an instance of fingerprint data from an end of the stroke, and at least one instance of fingerprint data in between the start and the end of the stroke and compare the instances of fingerprint data to one another to validate the fingerprint identity information.

18. The method as described in claim 8, wherein the first segment corresponds to an admin user profile that permits unrestricted use of the mobile device and the second segment corresponds to a limited user profile that restricts access to one or more features of the mobile device, and the segmenting the fingerprint sensor area is based in part on a frequency of use of the admin user profile relative to use of the limited user profile.

19. The system as described in claim 14, wherein the fingerprint sensor area is a size of a display screen of the mobile device and the first segment and the second segment, when combined, are the size of the display screen.

20. The system as described in claim 14, the one or more processors further configured to:
receive an additional touch-based gesture to the second segment, the additional touch-based gesture having a same shape as the shape of the touch-based gesture;
determine an additional action different from the action for performance by the mobile device, the additional action based on a shape of the additional touch-based gesture, the additional touch-based gesture being located within the second segment, and an association with the limited user profile; and
perform the additional action by the mobile device.

* * * * *